United States Patent
Nagaoka

[11] Patent Number: 6,119,823
[45] Date of Patent: Sep. 19, 2000

[54] BRAKE MECHANISM FOR ROTATOR

[75] Inventor: Yoshiki Nagaoka, Tokyo, Japan

[73] Assignee: Mitsubishi Denki Kabushiki Kaisha, Tokyo, Japan

[21] Appl. No.: 09/052,005

[22] Filed: Mar. 31, 1998

[30] Foreign Application Priority Data

Aug. 18, 1997 [JP] Japan ................................. 9-221252

[51] Int. Cl.⁷ ............................................... F16D 63/00
[52] U.S. Cl. .................................... 188/82.84; 242/343.2; 242/355
[58] Field of Search ..................... 242/343.2, 355, 242/156, 156.1, 156.2, 422.4; 188/80, 82.1, 82.5, 82.6, 82.7, 82.8, 82.84, 82.2

[56] References Cited

U.S. PATENT DOCUMENTS

| 4,570,870 | 2/1986 | Ito ........................................ 242/156.1 |
| 4,669,686 | 6/1987 | Huber et al. ............................... 188/80 |
| 4,807,061 | 2/1989 | Yoon ..................................... 360/74.1 |
| 5,217,180 | 6/1993 | Ruyten et al. . |
| 5,358,195 | 10/1994 | Kang ..................................... 242/343.1 |

FOREIGN PATENT DOCUMENTS

| 0168115A1 | 1/1986 | European Pat. Off. . |
| 1272646 | 6/1962 | Germany . |
| 60-157521 | 8/1985 | Japan . |
| 2-2278550 | 9/1990 | Japan . |
| 4-136528 | 5/1992 | Japan . |
| 6-243544 | 9/1994 | Japan . |

OTHER PUBLICATIONS

D.H. Offner, "Generalizing the Analysis of Shoe–Type Brake–Clutch Systems," Transactions of the ASME, Aug. 1969, pp. 694–701.
JP 4–136528 dated May 11, 1992, Japanese Abstract.

Primary Examiner—Robert J. Oberleitner
Assistant Examiner—Robert A. Siconolfi

[57] ABSTRACT

A brake mechanism for a rotator has a brake arm rotatably supported, a brake pad, a spring exerting force to the brake arm in a direction in which the brake pad is brought into contact with the rotator, and a rotation restriction pin for restricting a range of the rotation of the brake arm. When the rotator rotates in a direction, in which force for causing the brake arm to be brought toward the pin is exerted to the brake arm, the automatic biting condition is satisfied at the rotation braking start point, subsequently the brake arm comes into contact with the pin, and the relieving condition is satisfied. On the other hand, when the rotator rotates in an opposite direction, in which force against the force exerted to the brake arm by the spring is exerted to the brake arm, the relieving condition is satisfied at the rotation braking start point, and then the relieving condition is satisfied also when the rotator stops rotating.

20 Claims, 4 Drawing Sheets

BRAKE MECHANISM FOR ROTATOR

BACKGROUND OF THE INVENTION

The present invention relates to a brake mechanism for a rotator that is suitable to, for example, a device for stopping rotation of a reel base which is provided to wind a tape of a videocassette on a hub or unwind the tape from the hub.

An example of a conventional brake mechanism for a rotator is disclosed in Japanese Patent Kokai Publication No. 136528/1992. When the rotator rotates in the clockwise direction, the brake mechanism for the rotator stops the rotation of the rotator by causing the rotator, brake arm, and brake pad to satisfy an automatic biting condition. On the contrary, when the rotator rotates in the counterclockwise direction, the brake mechanism stops the rotation of the rotator by causing the rotator, brake arm, and brake pad to satisfy a relieving condition.

As shown in FIG. 6, the automatic biting condition is defined as satisfying conditions that a point 3d at which the brake pad comes into contact with an outer surface 10a of a rotator 10 is located upstream in a rotating direction CW of the rotator 10 from a straight line 8 connecting a rotation center 2a of the brake arm and a rotation center 10b of the rotator 10 and that $\sin \alpha < \mu \cos \alpha$ ($\mu$ denotes a friction coefficient of the brake pad, and $\alpha$ denotes an angle made by a normal 9 to the outer surface 10a of the rotator 10 that passes the point 3d at which the brake pad comes into contact with the outer surface 10a of the rotator 10 and a straight line that connects the point 3d at which the brake pad comes into contact with the outer surface 10a of the rotator 10 and the rotation center 2a of the brake arm). On the other hand, as shown in FIG. 7, the relieving condition is defined as satisfying a condition that the point 3d at which the brake pad comes into contact with the outer surface 10a of the rotator 10 is located downstream in the rotating direction CW of the rotator 10 from the straight line 8 that connects the rotation center 2a of the brake arm and the rotation center 10b of the rotator 10.

The brake mechanism that stops the rotation of the rotator by satisfying the automatic biting condition, as shown in FIG. 6, however, shows variations in braking torque, which may increase with changes in some factors such as a friction coefficient between the outer surface 10a of the rotator 10 and the brake pad and a distance (center-to-center distance) between the rotation center 10b of the rotator 10 and the rotation center 2a of the brake arm, as indicated by the characteristic curves shown in FIG. 8. In FIG. 8, a point "a" represents a rotation braking start point while a point "b" represents a moment at which the rotation of the rotator stops.

SUMMARY OF THE INVENTION

The present invention includes a brake mechanism for a rotator that can stop rotation of the rotator with a stable braking torque, irrespective of a rotating direction of the rotator.

According to the present invention, a brake mechanism for a rotator comprises: a brake member rotatably supported and including a contact portion which comes into contact with an outer surface of the rotator to stop rotation of the rotator; an elastic member for exerting force to the brake member in a direction in which the contact portion is brought into contact with the rotator; and a restriction member for restricting a range of the rotation of the brake member; an automatic biting condition being defined as satisfying conditions that a point at which the contact portion comes into contact with the outer surface of the rotator is located upstream in a rotating direction of the rotator from a straight line connecting a rotation center of the brake member and a rotation center of the rotator and that $\sin \alpha < \mu \cos \alpha$, where $\mu$ denotes a friction coefficient of the contact portion and $\alpha$ denotes an angle made by a normal to the outer surface of the rotator that passes the point at which the contact portion comes into contact with the outer surface of the rotator and a straight line that connects the point at which the contact portion comes into contact with the outer surface of the rotator and the rotation center of the brake member; and a relieving condition being defined as satisfying a condition that the point at which the contact portion comes into contact with the outer surface of the rotator is located downstream in the rotating direction of the rotator from the straight line that connects the rotation center of the brake member and the rotation center of the rotator; wherein the brake mechanism for the rotator is assembled in such a way that, when the rotator rotates in a first direction, in which force for causing the brake member to be brought toward the restriction member is exerted to the brake member of which the contact portion is in contact with the outer surface of the rotator, the automatic biting condition is satisfied at a rotation braking start point which is a moment the contact portion is brought into contact with the outer surface of the rotator, and subsequently the relieving condition is satisfied when the brake member comes into contact with the restriction member; and on the other hand, when the rotator rotates in a second direction, in which force against the force exerted to the brake member by the elastic member is exerted to the brake member of which the contact portion is in contact with the outer surface of the rotator, which is opposite to the first direction, the relieving condition is satisfied at the rotation braking start point, and then the relieving condition is also satisfied when the rotator stops rotating.

The brake mechanism for the rotator may further comprise a brake release means for rotating the brake member in such a direction that the contact portion is separated from the rotator, in opposition to the force exerted to the brake member by the elastic member. Therefore, the braking state established by the brake mechanism can be easily released.

The contact portion is formed by a brake pad made of, for example, an elastic material. Therefore, a stable braking torque is generated.

The brake member may have a U-shaped flexible portion between the rotation center thereof and the contact portion. Since the brake member flexes in its flexible portion, a stable braking torque is generated.

When the rotator rotates in the first direction, the automatic biting condition is satisfied at the rotation braking start point, subsequently the brake member comes into contact with the restriction member and the relieving condition is satisfied, a braking torque ranges from 150 [gfcm] to 1000 [gfcm]; and when the rotator rotates in the second direction, the braking torque ranges from 10 [gfcm] to 100 [gfcm].

BRIEF DESCRIPTION OF THE DRAWINGS

The present invention will become more fully understood from the detailed description given hereinbelow, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
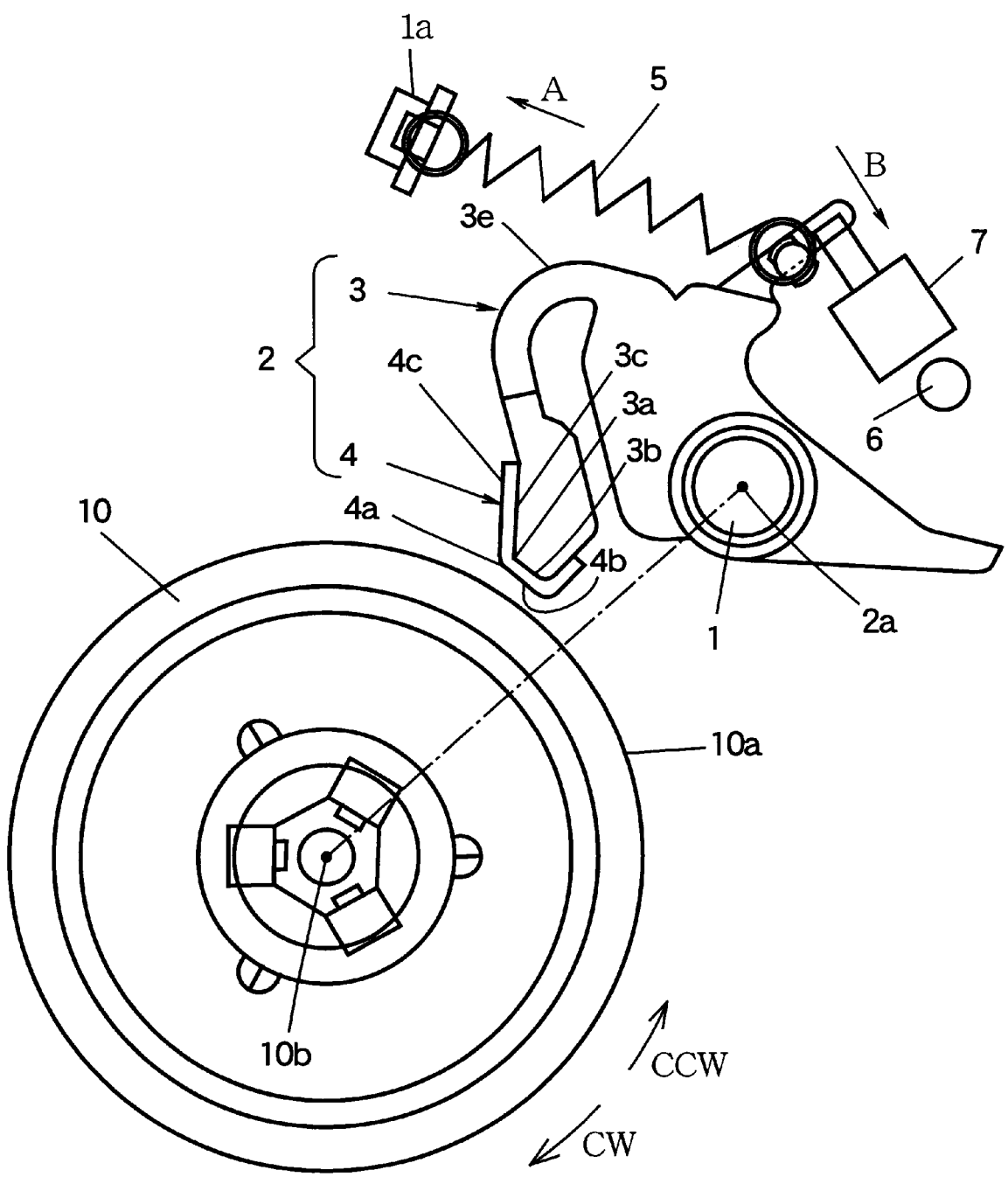
FIG. 1 is a schematic plan view showing a brake mechanism for a rotator according to an embodiment of the present invention.

FIG. 1 is a schematic plan view showing a brake mechanism for a rotator according to an embodiment of the present invention.

As shown in FIG. 1, the brake mechanism for the rotator of this embodiment has a shaft 1 mounted on a base plate (not shown) and a brake member 2 which is rotatably supported on the shaft 1.

The brake member 2 includes a brake arm 3 which is supported on the shaft 1, and a brake pad 4 which is provided at an end of the brake arm 3 and is brought into contact with an outer surface 10a of the rotator 10 in order to stop the rotation of the rotator 10. An example of the rotator 10 is a reel base that rotates in engagement with a hub on which a magnetic tape of a videocassette is wound. The present invention can also be applied to devices other than the reel base. Elastic materials such as felt, synthetic fiber (urethane, nylon, or other synthetics), and rubber are favorable for the brake pad 4.

The brake arm 3 is made of metal, for example, and has a flexible portion 3e, which is U-shaped in the plan view, between a rotation center 2a thereof and the brake pad 4. When the brake pad 4 comes into contact with the outer surface 10a of the rotator 10, the flexible portion 3e easily bends owing to elastic deformation.

A portion of the brake arm 3 on which the brake pad 4 is provided has an edge 3a, a first face 3b which is located on a tip side of the edge 3a, and a second face 3c which is located on a shaft side of the edge 3a. The surface of the brake pad 4 likewise has an edge 4a, a first face 4b which is located on the tip side of the edge 4a, and a second face 4c which is located on the shaft side of the edge 4a. The figures of the brake arm 3 and the brake pad 4, however, are not limited to those illustrated.

The brake mechanism for the rotator according to this embodiment also has a spring 5, which is engaged with a fixed portion 1a of the base plate at one end and with the brake arm 3 at the other end. The spring 5 exerts to the brake arm 3 such force in the direction A that brings the brake pad 4 into contact with the outer surface 10a of the rotator 10. Instead of the spring 5, a member made of other elastic material such as rubber may be used.

The brake mechanism for the rotator according to this embodiment further has a rotation restriction pin 6, which is mounted on the base plate so that it comes into contact with the brake arm 3 rotated by the spring 5, to limit a range of rotation of the brake arm 3.

The brake mechanism for the rotator according to this embodiment also has a solenoid 7, which causes the brake arm 3 to rotate in such a direction that the brake pad 4 is separated from the rotator 10, in opposition to the force in the direction A exerted to the brake arm 3 by the spring 5. The mechanism for rotating the brake arm 3 in such a direction that the brake pad 4 is separated from the rotator 10 is not limited to the solenoid 7 and may be a gear mechanism or other mechanism.

Figure 2:
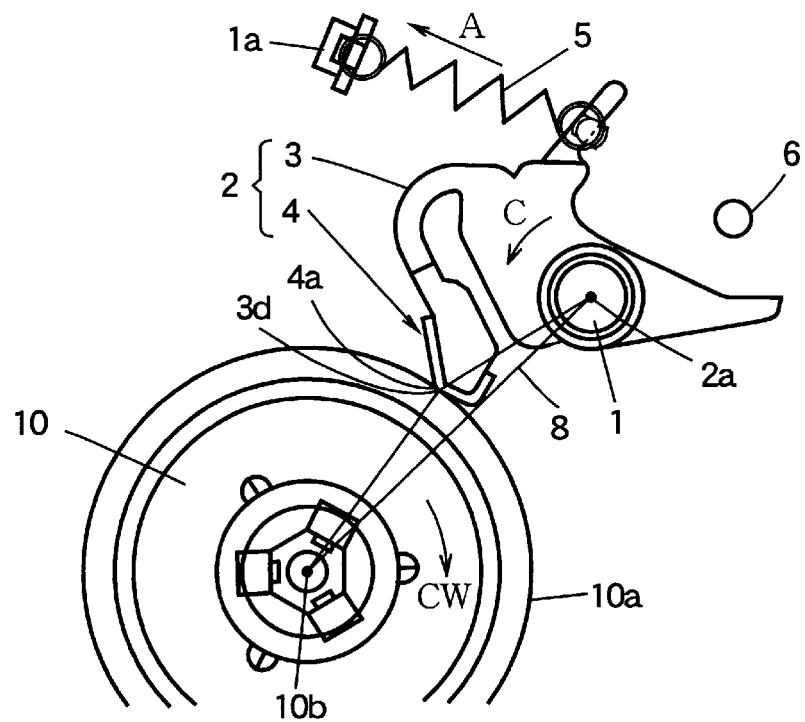
FIG. 2 is a plan view showing a state at the rotation braking start point, and is provided to illustrate an operation of the brake mechanism when the rotator rotates in the clockwise direction.
Figure 3:
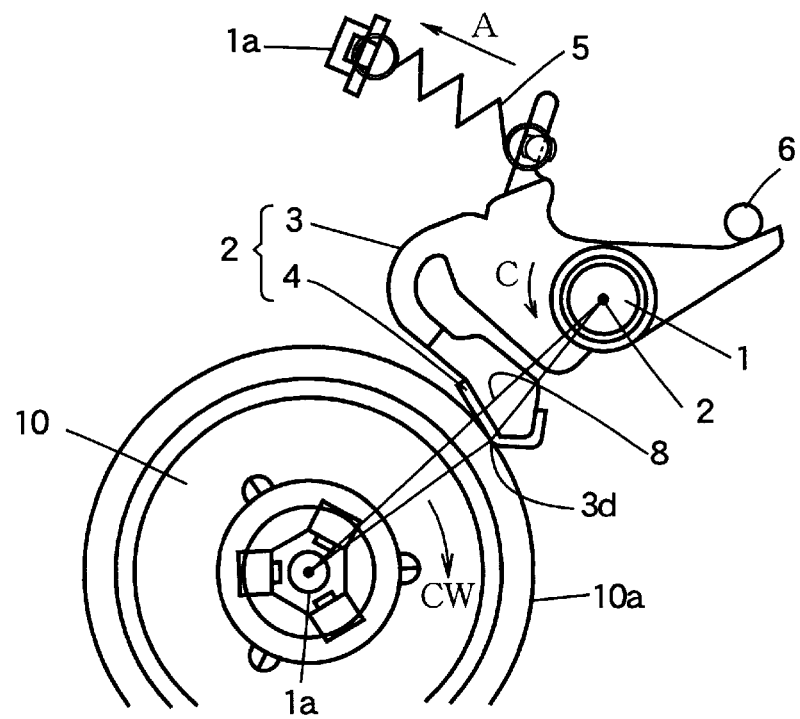
FIG. 3 is a plan view showing a state in which the rotator stops, and is provided to illustrate an operation of the brake mechanism when the rotator rotates in the clockwise direction.

FIGS. 2 and 3 illustrate the operation of the brake mechanism when the rotator 10 rotates in the clockwise direction CW. FIG. 2 is a plan view showing a state at the rotation braking start point, which is a moment when the brake pad 4 comes into contact with the outer surface 10a of the rotator 10, and FIG. 3 is a plan view showing a subsequent state, in which the rotator 10 stops.

First, as shown in FIG. 1, the brake pad 4 is kept off the rotator 10 by the force in the direction B exerted by the solenoid 7. At this time, the brake mechanism is inactive and the rotator 10 rotates in the clockwise direction CW.

Figure 6:
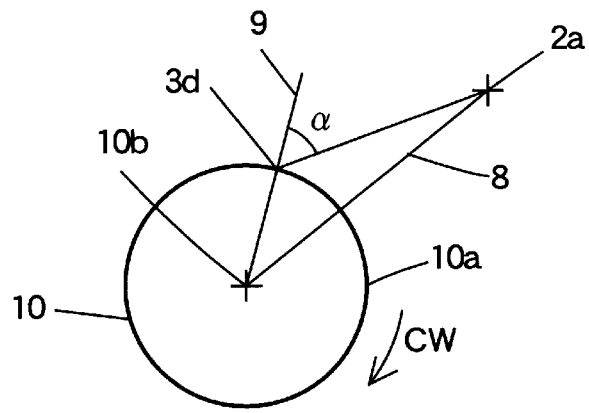
FIG. 6 is an explanatory diagram illustrating the automatic biting condition.
Figure 7:
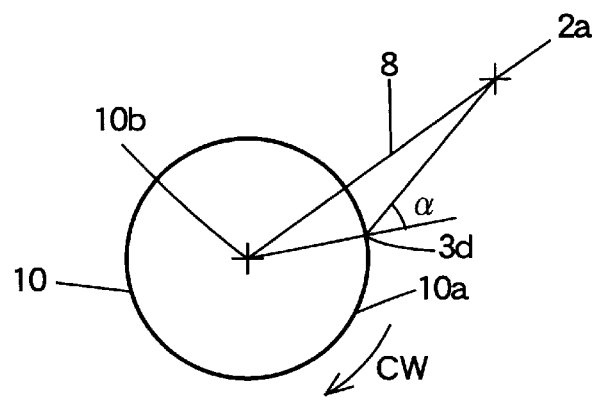
FIG. 7 is an explanatory diagram illustrating the relieving condition.
Figure 8:
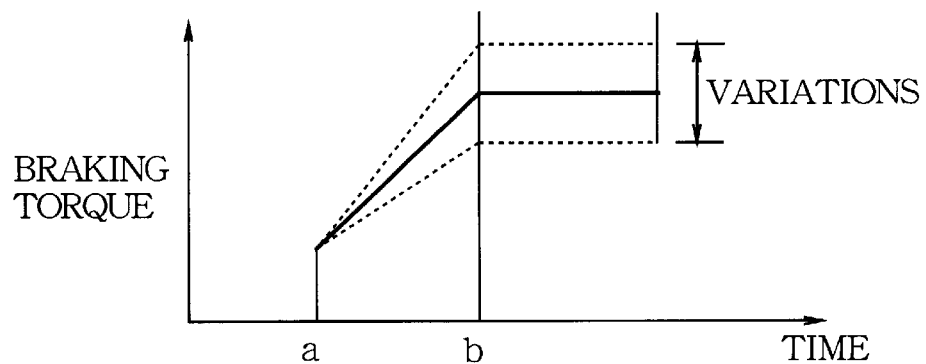
FIG. 8 is a characteristic diagram showing variations in braking torque when the automatic biting condition is satisfied.

When the force in the direction B exerted by the solenoid 7 is released, the force in the direction A exerted by the spring 5 causes the brake arm 3 to rotate in the direction C so that the edge 4a of the brake pad 4 comes into contact with the outer surface 10a of the rotator 10, as shown in FIG. 2. In the state at the rotation braking start point, which is illustrated in FIG. 2, the automatic biting condition is satisfied, that is, the brake mechanism satisfies the conditions that the contact point 3d between the brake pad 4 and the rotator 10 is found upstream, in the rotating direction of the rotator 10 (clockwise direction CW in this figure), from the straight line 8 connecting the rotation center 2a of the brake member 2 and the rotation center 10b of the rotator 10 and that $\sin \alpha < \mu \cos \alpha$ is satisfied, where $\mu$ denotes a friction coefficient of the brake pad, and $\alpha$ (see FIG. 6) denotes an angle made by the normal 9 to the outer surface 10a of the rotator 10 that passes the point 3d where the brake pad comes into contact with the outer surface 10a of the rotator 10 and the straight line that connects the point 3d where the brake pad comes into contact with the outer surface 10a of the rotator 10 and the rotation center 2a of the brake arm.

The rotator 10 further continues its rotation, increasing deformation of the brake arm 3. Meanwhile, the contact point 3d between the brake pad 4 and the rotator 10 exceeds the straight line 8 connecting the rotation center 10a of the rotator 10 and the rotation center 2a of the brake arm 3. The brake arm 3 rotates until the end of the brake arm 3 comes into contact with the rotation restriction pin 6, as shown in FIG. 3. In this state, the contact point 3d between the brake pad 4 and the rotator 10 is found downstream, in the rotating direction of the rotator 10 (clockwise direction CW in this figure), from the straight line 8 connecting the rotation center 2a of the brake member 2 and the rotation center 10b of the rotator 10, that is, the relieving condition is satisfied. At this time, the braking torque applied to the rotator 10 depends on rigidity and deformation of the brake arm 3 and the friction coefficient between the brake pad 4 and the rotator 10.

Figure 4:
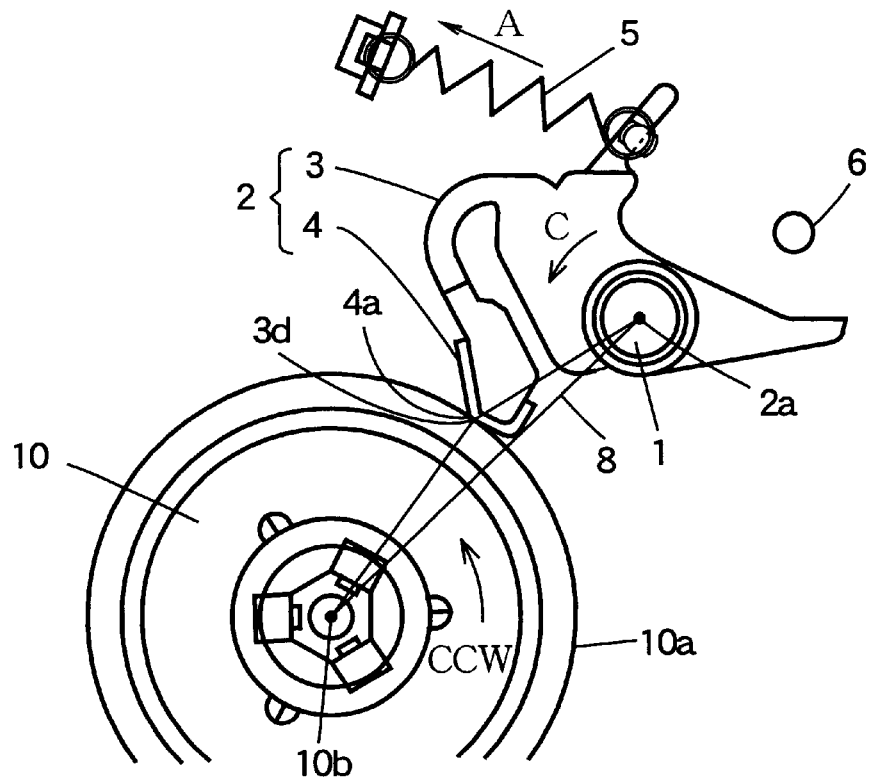
FIG. 4 is a plan view illustrating the operation of the brake mechanism when the rotator rotates in the counterclockwise direction.

FIG. 4 is a plan view illustrating operation of the brake mechanism when the rotator 10 rotates in the counterclockwise direction CCW and showing a state in which the brake pad 4 is in contact with the outer surface 10a of the rotator 10.

While the solenoid 7 is exerting force in the direction B, as shown in FIG. 1, the brake pad 4 is kept off the rotator 10, that is, the brake mechanism is inactive and lets the rotator 10 rotate in the counterclockwise direction CCW.

When the force in the direction B exerted by the solenoid 7 is released, the force in the direction A exerted by the spring 5 causes the brake arm 3 to rotate in the direction C so that the edge 4a of the brake pad 4 comes into contact with the outer surface 10a of the rotator 10, as shown in FIG. 4. In the state at the rotation braking start point, which is illustrated in FIG. 4, the contact point 3d between the brake pad 4 and the rotator 10 is found downstream, in the rotating direction of the rotator 10 (counterclockwise direction CCW in this figure), from the straight line 8 connecting the rotation center 2a of the brake member 2 and the rotation center 10b of the rotator 10, that is, the relieving condition is satisfied.

In this state, the automatic biting, as has been described in the operation against clockwise rotation, does not occur, and the brake arm 3 does not rotate any further. Therefore, this state is maintained until the rotator 10 stops. The braking torque applied to the rotator 10 depends on the force exerted by the spring 5 to press the brake arm 2 against the rotator 10 and the friction coefficient between the brake pad 4 and the rotator 10.

Figure 5:
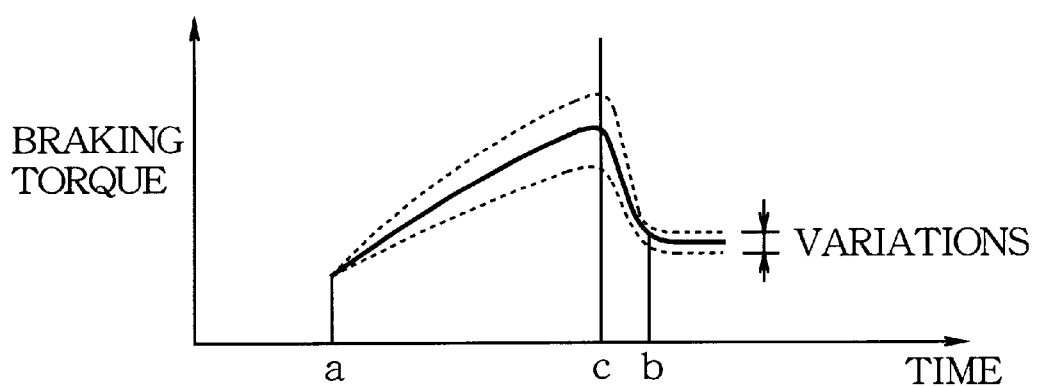
FIG. 5 is a characteristic diagram showing variations in braking torque when the relieving condition is satisfied.

FIG. 5 shows characteristic curves representing variations in braking torque while the brake mechanism for the rotator is performing the braking operation shown in FIGS. 2 and 3. In FIG. 5, a horizontal axis represents time while a vertical axis represents the braking torque applied to the rotator 10.

In FIG. 5, the point "a" on the time axis is the moment at which the brake pad 4 comes into contact with the rotator 10 (rotation braking start point). Then, with the passage of time, the automatic biting causes the brake arm 3 to rotate, increasing the deformation of the brake arm 3, the force that presses the brake pad 4 against the rotator 10, and the braking torque. At the point "c", the contact point 3d between the brake pad 4 and the rotator 10 exceeds the straight line 8 connecting the rotation center 10b of the rotator 10 and the rotation center 2a of the brake arm 3. After the point "c", the brake mechanism satisfies the relieving condition, resulting in a decrease in braking torque. Finally, the brake arm 3 comes into contact with the rotation restriction pin 6, and the rotator 10 stops its rotation at the point "b", where the braking torque becomes stable.

Because the brake arm 3 is kept in a deformed state at this time, the braking torque depends on the rigidity and deformation of the brake arm 3, the friction coefficient between the brake pad and the rotator, and the like. Therefore, the braking torque is different from the braking torque in the state shown in FIG. 4, where the relieving condition is satisfied after the braking start point of the rotator. For example, the mechanism is constructed so that when the brake arm 3 comes into contact with the rotation restriction pin 6 to satisfy the relieving condition after the automatic biting condition is satisfied at the rotation braking start point, the braking torque for the rotator rotating in the clockwise direction CW ranges from 150 [gfcm] to 1000 [gfcm], and the braking torque for the rotator rotating in the counterclockwise direction CCW ranges from 10 [gfcm] to 100 [gfcm].

As has been described above, even if the automatic biting condition is satisfied at the rotation braking start point, the brake mechanism for the rotator according to this embodiment can generate a stable braking torque by satisfying the relieving condition later.

What is claimed is:

1. A brake mechanism for a rotator comprising:
   a brake member rotatably supported and including a contact portion which comes into contact with an outer surface of the rotator to stop rotation of the rotator;
   an elastic member for exerting force to said brake member in a direction in which the contact portion is brought into contact with the rotator; and
   a restriction member for restricting a range of the rotation of said brake member;
   wherein the brake mechanism for the rotator is assembled in such a way that, when the rotator rotates in a first direction, in which force for causing said brake member to be brought toward said restriction member is exerted to said brake member of which the contact portion is in contact with the outer surface of the rotator, an automatic biting condition is satisfied at a rotation braking start point which is a moment the contact portion is brought into contact with the outer surface of the rotator, and subsequently a relieving condition is satisfied when said brake member comes into contact with said restriction member; and on the other hand, when the rotator rotates in a second direction, in which force against the force exerted to said brake member by said elastic member is extended to said brake member of which the contact portion is in contact with the outer surface of the rotator, which is opposite to the first direction, said relieving condition is satisfied at the rotation braking start point, and then said relieving condition is also satisfied when the rotator stops rotating.

2. The brake mechanism for the rotator of claim 1, further comprising a brake release means for rotating said brake member in such a direction that the contact portion is separated from the rotator, in opposition to the force exerted to said brake member by said elastic member.

3. The brake mechanism for the rotator of claim 1, wherein the contact portion is formed by a brake pad made of an elastic material.

4. The brake mechanism for the rotator of claim 1, wherein said brake member has a U-shaped flexible portion between the rotation center thereof and the contact portion.

5. The brake mechanism for the rotator of claim 1, wherein, when the rotator rotates in the first direction, the automatic biting condition is satisfied at the rotation braking start point, subsequently said brake member comes into contact with said restriction member and the relieving condition is satisfied, a braking torque ranges from 150 [gfcm] to 1000 [gfcm]; and when the rotator rotates in the second direction, the braking torque ranges from 10 [gfcm] to 100 [gfcm].

6. A brake mechanism for a rotator, that can stop rotation of the rotator with a stable braking torque regardless of a rotation direction of the rotator, comprising:
   a brake member flexibly attached to a braking surface, wherein the rotator rotates in a first direction, in which force is exerted on said brake member to cause the braking surface to make contact with a surface of the rotator so as to satisfy an automatic biting condition, and subsequently satisfying a first relieving condition, wherein the first relieving condition is satisfied when said brake member makes contact with a restriction member.

7. The brake mechanism for the rotator according to claim 6, wherein the rotator rotates in a second direction, in which force is exerted on said brake member to cause the braking surface to make contact with a surface of the rotator so as to satisfy a second relieving condition.

8. A braking apparatus for a bidirectionally rotated rotator driving an information recording medium, comprising:

a braking surface rotating with said bidirectionally rotated rotator;

a brake frictionally interacting with said braking surface;

a braking actuating member supporting said brake, said braking actuating member pivoting about a pivot axis, and said braking actuating member presenting said brake against said braking surface with a stable braking force independent of a direction of rotation of said bidirectionally rotated rotator, wherein when said bidirectionally rotated rotator rotates in a first direction, said brake is presented against said braking surface such that when said brake comes into contact with said braking surface at a point offset a predetermined distance above a straight line connecting a rotation center of said bidirectionally rotated rotator to a center of the pivot axis, and said brake subsequently comes into contact with said braking surface at a point offset a predetermined distance below the straight line connecting the rotation center of said bidirectionally rotated rotator to the center of the pivot axis and said braking actuating member comes into contact with a rotation restriction member mounted on a base plate, said bidirectionally rotated rotator stops rotating.

9. The braking apparatus according to claim 8, wherein when said bidirectionally rotated rotator rotates in the first direction, said brake is presented against said braking surface such that when sin $\alpha < \mu$ cos $\alpha$ wherein $\mu$ denotes a friction coefficient of said brake, $\alpha$ denotes an angle formed by a first straight line connecting the point on said braking surface to the center of the pivot axis and a second straight line that passes through a point where said brake comes into contact with said braking surface and continues to the rotation center of said bidirectionally rotated rotator, and said brake subsequently comes into contact with said braking surface at the point offset the predetermined distance below the straight line connecting the rotation center of said bidirectionally rotated rotator to the center of the pivot axis and said braking actuating member comes into contact with the rotation restriction member mounted on the base plate, said bidirectionally rotated rotator stops rotating.

10. The braking apparatus according to claim 8, wherein when said bidirectionally rotated rotator rotates in a second direction, said brake is presented against said braking surface such that when said brake comes into contact with said braking surface at a point offset a predetermined distance below a straight line connecting a rotation center of said bidirectionally rotated rotator to a center of the pivot axis and said braking actuating member comes into contact with a rotation restriction member mounted on a base plate, said bidirectionally rotated rotator stops rotating.

11. The braking apparatus according to claim 9, wherein when said bidirectionally rotated rotator rotates in the first direction, an automatic biting condition is satisfied, and subsequently a relieving condition is satisfied until said bidirectionally rotated rotator stops rotating.

12. The braking apparatus according to claim 10, wherein when said bidirectionally rotated rotator rotates in the second direction, a relieving condition is satisfied until said bidirectionally rotated rotator stops rotating.

13. A braking apparatus for a bidirectionally rotated rotator driving an information recording medium, comprising:

a braking surface rotating with said bidirectionally rotated rotator;

a brake frictionally interacting with said braking surface;

a braking actuating member supporting said brake, said braking actuating member pivoting about a pivot axis, and said braking actuating member presenting said brake against said braking surface with a stable braking force independent of a direction of rotation of said bidirectionally rotated rotator, wherein a flexible brake arm attaches said braking actuating member to said brake.

14. The braking apparatus according to claim 13, wherein a rigid quality of said brake arm allows said braking actuating member to present said brake against said braking surface with the stable braking force independent of the direction of rotation of said bidirectionally rotated rotator.

15. A method of braking a bidirectionally rotating rotator driving an information recording medium, comprising the steps of:

rotating a braking surface with said bidirectionally rotated rotator;

frictionally interacting a brake with said braking surface;

presenting said brake against said braking surface with a stable braking force independent of a direction of rotation of said bidirectionally rotated rotator, wherein when said bidirectionally rotated rotator rotates in a first direction, said brake is presented against said braking surface such that when said brake comes into contact with said braking surface at a point offset a predetermined distance above a straight line connecting a rotation center of said bidirectionally rotated rotator to a center of a pivot axis of a pivotally supported braking actuating member, and said brake subsequently comes into contact with said braking surface at a point offset a predetermined distance below the straight line connecting the rotation center of said bidirectionally rotated rotator to the center of the pivot axis and said braking actuating member comes into contact with a rotation restriction member mounted on a base plate, said bidirectionally rotated rotator stops rotating.

16. The method of braking according to claim 15, wherein when said bidirectionally rotated rotator rotates in a second direction, said brake is presented against said braking surface such that when said brake comes into contact with said braking surface at a point offset a predetermined distance below a straight line connecting a rotation center of said bidirectionally rotated rotator to a center of a pivot axis of a pivotally supported braking actuating member and said braking actuating member comes into contact with a rotation restriction member mounted on a base plate, said bidirectionally rotated rotator stops rotating.

17. The method of braking according to claim 15, wherein when said bidirectionally rotated rotator rotates in the first direction, said brake is presented against said braking surface such that when sin $\alpha < \mu$ cos $\alpha$ wherein $\mu$ denotes a friction coefficient of said brake, $\alpha$ denotes an angle formed by a first straight line connecting a point on said braking surface to the center of the pivot axis and a second straight line that passes through a point where said brake comes into contact with said braking surface and continues to the rotation center of said bidirectionally rotated rotator, and said brake subsequently comes into contact with said braking surface at the point offset the predetermined distance below the straight line connecting the rotation center of said bidirectionally rotated rotator to the center of the pivot axis and said braking actuating member comes into contact with the rotation restriction member mounted on the base plate, said bidirectionally rotated rotator stops rotating.

18. The brake mechanism for the rotator of claim 1, wherein said automatic biting condition is satisfied while said rotator rotates in a first direction when a point at which the contact portion comes into contact with the outer surface of the rotator is located upstream in a rotating direction of the rotator from a straight line connecting a rotation center of said brake member and a rotation center of the rotator and that $\sin \alpha < \mu \cos \alpha$, where $\mu$ denotes a friction coefficient of the contact portion and $\alpha$ denotes an angle made by a normal to the outer surface of the rotator that passes the point at which the contact portion comes into contact with the outer surface of the rotator and a straight line that connects the point at which the contact portion comes into contact with the outer surface of the rotator and the rotation center of said brake member; and said relieving condition is satisfied while said rotator rotates in a second direction when a point at which the contact portion comes into contact with the outer surface of the rotator is located downstream in the rotating direction of the rotator from the straight line that connects the rotation center of said brake member and the rotation center of the rotator.

19. The braking apparatus according to claim 13, wherein when said bidirectionally rotated rotator rotates in a first direction, said brake is presented against said braking surface such that when said brake comes into contact with said braking surface at a point offset a predetermined distance below a straight line connecting a rotation center of said bidirectionally rotated rotator to a center of the pivot axis and said braking actuating member comes into contact with a rotation restriction member mounted on a base plate, said bidirectionally rotated rotator stops rotating.

20. The braking apparatus according to claim 19, wherein when said bidirectionally rotated rotator rotates in the first direction, a relieving condition is satisfied until said bidirectionally rotated rotator stops rotating.

* * * * *